US012498670B2

(12) United States Patent
De Marchi

(10) Patent No.: US 12,498,670 B2
(45) Date of Patent: Dec. 16, 2025

(54) PENDULUM, PARTICULARLY FOR USE IN A CLOCK

(71) Applicant: Andrea De Marchi, Turin (IT)

(72) Inventor: Andrea De Marchi, Turin (IT)

(73) Assignee: Andrea De Marchi, Turin (IT)

( * ) Notice: Subject to any disclaimer, the term of this patent is extended or adjusted under 35 U.S.C. 154(b) by 330 days.

(21) Appl. No.: 18/302,696

(22) Filed: Apr. 18, 2023

(65) Prior Publication Data

US 2024/0353798 A1 Oct. 24, 2024

(51) Int. Cl.
*G04B 17/02* (2006.01)

(52) U.S. Cl.
CPC .................................... *G04B 17/02* (2013.01)

(58) Field of Classification Search
CPC .... G04B 17/02; G04B 17/00; G04B 45/0053; G04B 45/0046; G04B 17/025; G04C 3/0276; G04C 5/00; G04C 3/00; G04C 5/005; G04C 3/0278; G04C 11/082
See application file for complete search history.

(56) References Cited

U.S. PATENT DOCUMENTS 4,196,579 A * 4/1980 Schaefer ................ G04C 10/00 368/165
4,395,137 A * 7/1983 Wiley .................. G04C 11/082 368/182
4,829,495 A * 5/1989 Kaneko .............. G04B 45/0053 968/105
5,442,601 A * 8/1995 Chen ...................... G04C 3/008 368/134
5,446,704 A * 8/1995 Chen ...................... G04B 17/02 368/134
5,638,340 A * 6/1997 Schiefele ........... G04B 45/0053 40/485

* cited by examiner

*Primary Examiner* — Edwin A. Leon
(74) *Attorney, Agent, or Firm* — Ferguson Case Orr Paterson

(57) ABSTRACT

A pendulum includes a movable body connected to a stationary supporting structure for oscillation in a fixed vertical plane. The pendulum further includes a control and stabilization system for controlling and stabilizing the oscillation amplitude of the movable body. The control and stabilization system includes a braking device which includes a permanent magnet and an electrically conductive element, one of which is attached to the movable body and the other of which is connected to the supporting structure such that when the movable body approaches one end of the oscillation field, the generated magnetic flux causes a braking of the movable body's motion. The quality factor Q of the pendulum is substantially proportional to the inverse of a power, at least equal to the square, of the amplitude of the oscillation of the movable body with the amplitude is close to the desired amplitude of oscillation.

9 Claims, 10 Drawing Sheets

PENDULUM, PARTICULARLY FOR USE IN A CLOCK

The present invention relates to the stabilization of the amplitude of oscillation of pendulums, in particular, but not exclusively, for clocks.

More specifically, the present invention relates to a pendulum in which a body (bob) is supported in a stationary supporting structure so that it can oscillate in a vertical plane fixed relative to said structure.

STATE OF THE ART AND RELATED PROBLEMS

It is well known that the period of oscillation of a simple pendulum is not perfectly isochronous, but varies according to the oscillation amplitude. This fact, commonly referred to as "circular deviation" or "circular error," has been a main concern for clockmakers for centuries, and "masters" have proposed and implemented various solutions aimed at enabling ever better performances in measuring time.

Indeed, the amplitude of oscillation of a pendulum can vary in operation due to a variety of factors, and this in turn affects the period of oscillation. Factors affecting the amplitude of the oscillation include, for example, dimensional instabilities of materials, changes in friction or drive pulses, changes in temperature, humidity, atmospheric pressure, gravity, and seismic noise.

The worry for clock makers stemmed and still stems particularly from the magnitude of the circular error, which is far from being insignificant for a clock regulator, since its relative value is of the order of the square of the angular amplitude of oscillation divided by 16. For example, for a small oscillation amplitude of only 40 mrad, the relative circular period error would be of the order of $10^{-4}$ and, as a consequence, its variations with amplitude changes would be 5 percent per mm ($5\times10^{-6}$/mm) for a typical 1 m pendulum with a period of 1 s. In terms of time this would introduce an error of the order of one second in a single day for an amplitude instability of just 1 mm, a rather disappointing performance for a precision clock.

Historically, the best manufacturers have followed one of two opposite approaches to the circular error problem, one approach consisting in operating the pendulum with a very small oscillation amplitude to reduce its magnitude, and the other consisting in modifying the curve that relates the circular error to the oscillation amplitude to make the pendulum "more isochronous".

Most of the successful pendulum manufacturers, such as Siegmund Riefler, William H. Shortt, Philip Woodward and Will Hall, to name a few (probably the best), adopted the first approach, which then forced them to deal with the daunting problem related to the extremely high mechanical accuracies required to keep the oscillation amplitude and other sources of error as constant as possible.

Instead, a small group of "brave" clockmakers took on the challenge of modifying the circular error, following Huygens' theoretical demonstration that pinching the flexible suspension element of a pendulum's moving body between two "cheeks" with a cycloidal profile would cancel it out.

Huygens's solution with cycloidal cheeks proved impractical in reality for reasons basically related to the fact that the curvature of the cycloid diverges in the cusp, and only in recent times has it been realized why this is a problem. A different expedient, however, enabled Feodosil M. Fedchenko of the Leningrad VNIIFTRI to achieve a sufficiently effective cancellation of the circular error, up to the amplitude of oscillation he desired, by the addition to the pendulum suspension of patiently calibrated springs. His AChF-3 clock, of which he built more than 50 between the 1950s and 1970s, with its daily stability of one millisecond, achieved in a vacuum, remains one of the best pendulum clocks ever made.

Nevertheless, probably intrigued by the contrarian creed stubbornly held some 300 years ago and throughout his life by the great clockmaker John Harrison, the winner of the Longitude Prize, a small group of followers attempted to develop practical suspension solutions with the "cheeks" approach, adopting however a circular profile for the cheeks, which is much less problematic than the cycloidal profile. It thus turned out that non-cycloidal profiles do not achieve isochronism, in principle, but still change the period-amplitude curve, and can easily produce situations of minimum in the circular error versus amplitude curve at non-zero amplitudes.

However, such attempts were never fully successful and did not result in a complete, working and tested clock prototype, presumably due to the failure to fully understand fundamental critical issues of the cheek solution in relation to temperature compensation and stabilization of the oscillation amplitude at the minimum period value. In fact, although a discussion of these issues is not found in the literature, based on theoretical analysis it appears that

- if the cheeks are pushed toward each other to clamp the flexible suspension element, then stringent conditions on the thickness of the flexible element and the radius of curvature must be met to ensure the existence of a minimum of the circular error,
- if, on the other hand, a portion of the gap is left free between the cheeks and the flexible element, e.g., for the purpose of facilitating temperature compensation, the stability of the gap(s) between the cheeks into which the pendulum's moving body suspension element extends is extremely critical for the stability of the period of oscillation, which in turn makes temperature compensation difficult; and
- last but not least, the quality factor Q of a pendulum with cheeks is dominated, at small amplitudes, by the loss of energy from imperfect elasticity of the flexible suspension element as it periodically winds/unwinds on/from the cheeks; consequently, the Q-factor in that range increases with the amplitude, making it hard if not impossible to keep it under control, as an inherently unstable condition can be produced in which an amplitude increase requires a decreasing push to be maintained.

John Harrison apparently did not focus on this problem when implementing the cheeks solution, or at least he never mentioned it explicitly, but for sure he knew that a problem existed at small amplitudes. In fact, throughout his life he asserted, strongly and stubbornly, that high period stability could only be guaranteed in a pendulum by operating it at large amplitudes, to exploit the natural stabilizing action exerted by air resistance. In a way this sounds today like an implicit admission that he was unable to stabilize the oscillation amplitude at small values, and of this he did not understand the reasons why. It is now clear that the amplitude stabilizing effect he was using was a result of the decreasing Q that friction with turbulent air produces at increasing amplitudes due to the dependance of air resistance on the square of velocity. Harrison didn't know that, because the laws of aerodynamics had not been found yet at his time, but he was a genius and somehow devised a solution for a problem he was not able to describe for lack of a theoretical frame.

At least one other mechanism exists that limits the value of Q at large amplitudes of oscillation, notably the stretching of the suspension element of the oscillating body, however, it normally becomes relevant at very large amplitudes, where however the spring material is stretched near the yield point, which induces risk of period drift and failure. The Harrison choice of air resistance was a good one for his time, but it's obviously not going to work in the vacuum environment typically used in today's high-precision clock devices.

Harrison didn't operate his pendulum clocks in vacuum because at his time vacuum technology was not yet well developed. Probably for this reason he did not realize that they could not operate in vacuum. However, his genius was able to convert what most considered a handicap (air resistance) into an asset, which he exploited in his clocks as discussed below. In the 1980s and 1990s, two twin clocks known as "clock A" and "clock B" were made by the so called Harrison group, following the indications left by Harrison in his writings. The technical and human story of such clocks is told, with particular regard to the latter, in the compelling volume "Harrison decoded" by Rory McEvoy and Jonathan Betts, Oxford University Press, 2020, DOI: 10.1093/oso/9780198816812.003.0001.

In those clocks, the residual sensitivity of the oscillation amplitude due to the circular error at a specific working point (at an amplitude slightly greater than that at which the period is minimum) is exploited to compensate for period variations caused by air density instabilities. Results measured over three months at the Greenwich Observatory in 2014 confirm that Clock B is by far the best air-operating pendulum clock ever made, with less than one second of uncertainty per hundred days of observation, that is, with a stability of about one-tenth of a millionth of that duration.

So, Harrison used air resistance to stabilize oscillation amplitude. As a matter of fact, in his solution the value of the quality factor Q at large oscillation amplitudes turns out to be proportional to the inverse of amplitude due to air resistance in turbulent regime. This can grant stability, although a faster Q decrease would be desirable. In addition, he was able to define a working amplitude slightly greater than the period minimum, where compensation would occur between air resistance variations, the residual variations of circular error, variations in the errors related to air density, and those related to the operation of the escapement system that regulated the force, duration, and timing of the mechanical impulse used to maintain the oscillation.

Harrison's solution, however, is not usable for a pendulum operating in a vacuum because air resistance is instrumental not only in compensating for errors due to bob buoyancy (not a problem in vacuum operation), but also and especially in stabilizing the oscillation amplitude at the desired working point of the circular error curve. In vacuum, where a modern precision pendulum must swing, air resistance cannot be used and a different approach to amplitude stability in cheek pendulums must be found.

The stretching of the suspension element under the combined action of centrifugal force and gravity could theoretically be used in vacuum pendulums for the purpose, but in practice the suspension element would be stressed too close to its yield, increasing creep and the risks of fatigue failure.

The solution proposed by this invention allows to introduce a Q limitation with much higher negative slope versus amplitude than air resistance can do, by using electromagnetic (e.m.) damping in a novel way which is here referred to as "edge damping", as opposed to the usual "bulk damping" of e.m. brakes, like those adopted for different reasons in the two pendulum cases illustrated here below as an example of the state of the art.

In U.S. Pat. No. 1,527,255 in the name of Leon Hatot a clock is described and illustrated comprising a pendulum including an oscillating body in a vertical plane, to the lower end of which is attached the central part of a permanent magnet in the shape of an arc of a circle, having its center on the axis of rotation of the moving body, and magnetized in the direction of its length. Attached to the supporting structure of the clock is a coil comprising a first and a second winding or solenoid, mounted and connected in series but wound in opposite directions.

Such a coil is arranged near one end of the angular field of oscillation of the oscillating body or coil. The first solenoid of the coil acts as a motor, and in operation generates a magnetic field that interacts with the field generated by the magnet in such a way as to induce angular acceleration of the oscillating body in the direction of said end of the field of oscillation. The second solenoid, on the other hand, acts as a brake, and generates a magnetic field that interacts with that of the magnet in such a way as to counteract the displacement of the moving body when it reaches near the said end of the oscillation field. When the oscillating body is in a vertical position one polar end of the magnet extends only into the first solenoid, and when the moving body reaches the end position at said end of the oscillation field, that polar end of the magnet extends through both solenoids of the coil and out of the latter.

Then, when the oscillating body moves in the opposite direction and goes beyond the vertical position by a certain angle, said polar end of the magnet exits the coil completely, and the magnetic flux induced by the magnet inside the coil is substantially reduced.

In a position symmetrical to that of the aforesaid coil with respect to the vertical may be arranged an additional winding or solenoid with short-circuited coils, or simply a metal tube in which, when the oscillating body approaches the other end of the oscillating field, the other polar end of the magnet induces eddy currents that generate a braking effect on the oscillating body, and when the latter reaches the end position the corresponding polar end of the magnet extends through and beyond the aforementioned supplementary coil or metal tube.

The solution described in the above US patent makes it possible to achieve some stabilization of the pendulum's amplitude of oscillation, sufficient for clocks of normal or low precision, like Hatot's "pendulette". However, since when the movable body approaches an end position a polar end of the permanent magnet passes through the entire braking winding or solenoid (or metal tube), and this in one direction before reaching the end position and in the reverse direction after reaching that position, the quality factor Q of such a solution is particularly low and is little dependent on the amplitude of oscillation of the movable body. The "brakes" of Hatot's solution are therefore not particularly suitable for achieving a high stabilization of the oscillation amplitude, being in fact "bulk brakes" that act by inducing a very large amount of magnetic flux within said "brakes."

In Mastner G et al: "Foucault pendulum with eddy-current damping of the elliptical motion," Review Of Scientific Instruments, American Institute Of Physics, 2 Huntington Quadrangle, Melville, NY 11747, vol. 55, no. 10, Oct. 1, 1984, pages 1533-1538, XP001433420, ISSN: 0034-6748 a Foucault pendulum used to visualize the rotational motion of the earth is described. In a Foucault pendulum, the moving body is suspended from a stationary supporting structure in such a way that in operation it does not swing in a fixed plane relative to that structure, but rather in a plane rotating with respect to said structure due to the earth's rotation. Moreover, instead of performing only a simple longitudinal oscillation, due to parasitic forces such a body also performs at the same time a transverse cosine oscillation, so that the trajectory of the moving body, projected onto a horizontal plane, is not a straight line but an ellipse. Such an elliptical motion causes the superimposition of an undesirable precession on the rotation of the pendulum's plane of oscillation. According to the paper under review here, the amplitude of the transverse cosine oscillation is reduced by means of an eddy-current braking device comprising a permanent magnet attached to the oscillating body, which, before each reversal of motion, flies over a frustoconical copper goniometric ring inducing eddy currents therein. The resulting braking effect is particularly intense for the transverse component of the oscillation. The longitudinal component of the oscillation is also damped, but this is considered irrelevant in the paper, and can be compensated for with a more powerful drive for the pendulum. The paper also shows in a figure an experimental curve of Q versus amplitude, which has a steep section at the amplitudes where the copper ring effectively acts as an "edge damper" (although the amplitude axis is clearly and demonstrably mistaken in the figure, which makes the steep section appear beyond the inner edge of the ring when it should instead be located before it), but this feature is not correctly interpreted in the paper, and most certainly not used for amplitude stabilization, as the swing is forced to reach toward the center or even the far edge of the ring damper. The Q measurement was reported in the paper only to show that a longitudinal damping effect exists and therefore it can be induced that also the transversal motion, which was the sole concern of the authors, gets damped too.

However, the Q measurements reported in this paper are very interesting because they show how the Q is sloping down inversely proportional to amplitude when the latter is smaller than the inner radius of the damping Cu ring, Presumably limited by the air viscous resistance, and again is sloping in a similar way, but at much smaller values, when the amplitude is such that the magnet onboard the Bob ends up hovering the Cu ring, at the end of its swing, limited by the similarly viscous resistance produced by the induced Eddy Currents in the ring. In the transition region between the two regimes the slope of the Q vs amplitude θ curve is very steep, and that is where the "edge damping" features that are exploited in this invention appear.

SUMMARY OF THE INVENTION

In view of the state of the art described above, one purpose of the present invention is to provide an improved pendulum of the type initially defined, suitable also for operation with a suspension element extending between cylindrical cheeks, and capable of allowing improved stabilization of the amplitude of oscillation.

This and other purposes are achieved according to the invention with pendulums whose main features are defined in claims 1 and 9.

Such pendulums also represent a considerable improvement over Harrison's pendulums, both because the use of electromagnetic braking according to the invention enables a pendulum with cheeks suspension to operate in an excellent manner even in a vacuum, replacing the air resistance in a turbulent regime for a passive stabilization of the oscillation amplitude, and because in a pendulum for operation in air, due to the greater rate of reduction of the Q-factor with amplitude, it is relatively easy to make the effect of electromagnetic braking preponderant over that of air resistance, by consequently reducing, among other things, the effect on the period of air density changes and thus facilitating a compensation by Harrison's method, that is, by choosing an amplitude of oscillation somewhat larger than that which minimizes the period of the oscillation.

Particular pendulum embodiments according to the invention are defined in the dependent claims.

BRIEF DESCRIPTION OF THE DRAWINGS

Further objects, features and advantages of the invention will appear from the detailed description below, provided purely by way of non-limiting examples with reference to the attached drawings, in which.

DETAILED DESCRIPTION OF EMBODIMENTS

Figure 1:
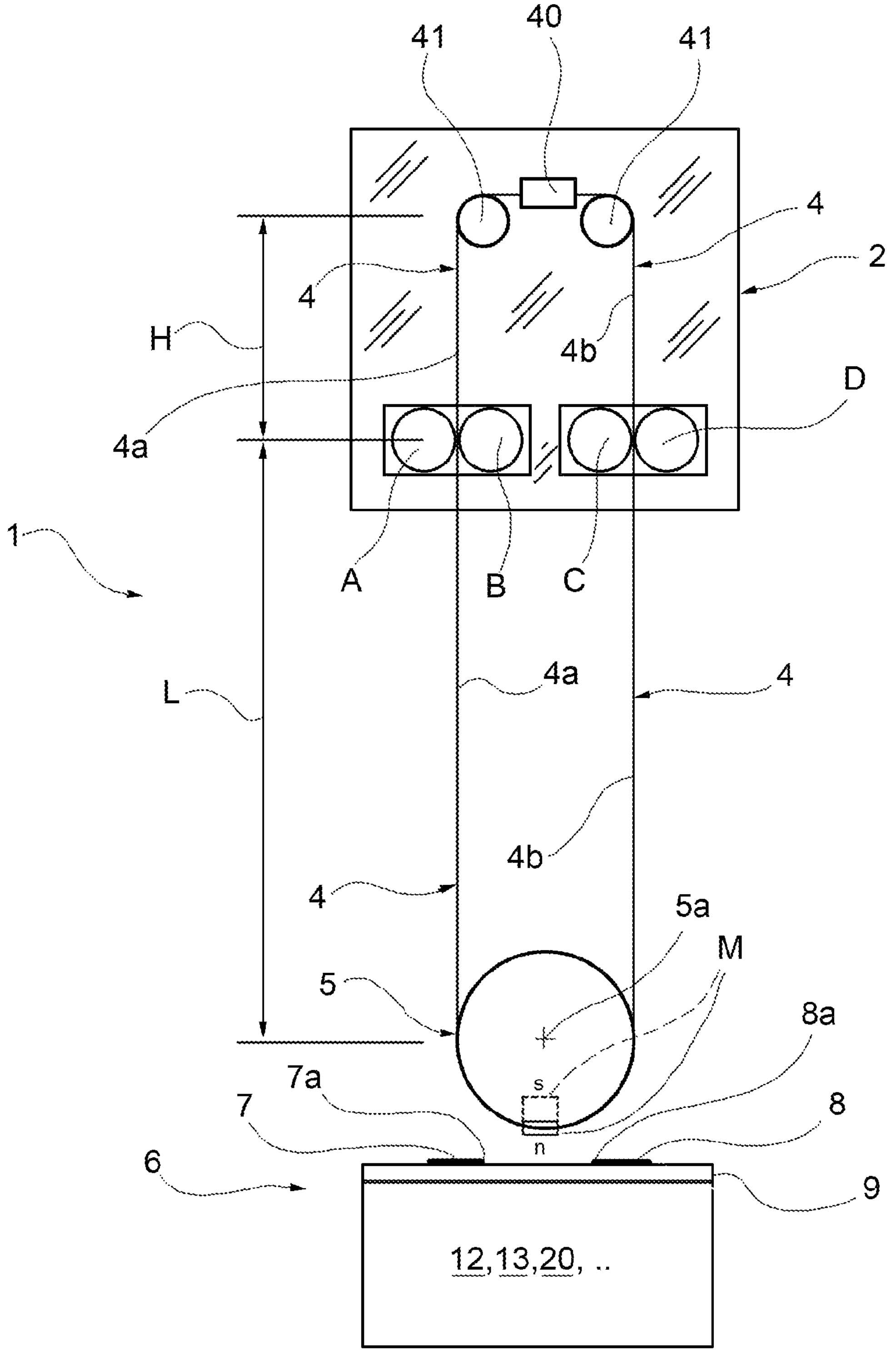
FIG. 1 is a schematic representation of a pendulum according to the present invention.

In FIG. 1 with 1 is indicated an improved pendulum according to the invention.

In the embodiment illustrated therein the pendulum 1 comprises an operationally stationary support structure including a rigid body 2, e.g. of aluminum, in which two pairs of parallel, preferably but not necessarily coplanar, supporting elements or cheeks A, B and C, D, made for example of a metallic material, are arranged.

In the illustrated example the supporting elements A, B and C, D are cylinders with a circular cross section, arranged with their respective longitudinal axes horizontal and parallel. Such cylinders can be made for instance of Al 7075 (Ergal).

Between adjacent cylinders of each pair A, B and C, D are defined respective interspaces or gaps, having a same predetermined width.

A flexible suspension element, made of an essentially inextensible metallic material, exhibiting a very low coefficient of thermal expansion and a high Young's modulus value, is indicated 4 in FIG. 1. Such a suspension element 4 is, for example, a tantalum tape, having an approximate thickness of 10 μm and a width of 10 mm.

In other embodiments, a thread or multiple ribbons or threads may be used instead of a tape.

At the top of body 2 the ends of suspension element 4 are connected to a regulating device 40 whose functions will be described later.

From the regulating device 40 the two end branches of the suspension element 4 deflect downward at respective horizontal cylindrical deflection rollers or idlers 41 and then extend into the interspaces or gaps defined between the pairs of cylinders or cheeks A, B and C, D. Below these cylinders the tape 4 forms a kind of loop wrapped around an oscillatable body or bob 5 having a predetermined mass. Such a body 5 may be, for example, cylindrical or spherical in shape, and in FIG. 1 its horizontal axis, which is orthogonal to the plane of oscillation, is indicated *5a*.

Between body 5 and cylinders A-D the two branches *4a* and *4b* of tape 4 are essentially parallel to each other, but this condition is not binding, since in alternative embodiments these branches can be slightly converging or diverging upward.

By L in FIG. 1 is indicated the vertical distance between the axis *5a* of body 5 and the horizontal plane containing the axes of cylinders A-D when body 5 is at its lowest position, and H denotes the distance between the plane containing the axes of cylinders A-D and the horizontal plane containing the axes of idlers 41. As an example, the distance L can be 15 cm or greater, and the distance H can be 5 cm or greater.

The regulating device 40 is arranged to implement a fine adjustment of the H/L ratio as the temperature changes, so that the thermal expansion of the flexible element 4 is compensated by that of the supporting body 2 and the length L of the pendulum is maintained essentially constant.

The arrangement described above is such that when body 5 oscillates in a vertical plane below cylinders A-D, the two branches *4a* and *4b* of tape 4 wind/unwind on/from one and then on/from the other of the curved bearing surfaces of cylinders A, B and C, D, respectively, between which the interspaces or gaps mentioned above are defined.

By virtue of the winding/unwinding of the tape 4 on/by the cylinders A, B and C, D, in the oscillation the body 5 follows a trajectory having a radius of curvature that is not constant, but varies between a maximum value and an absolute minimum value.

Figure 2:
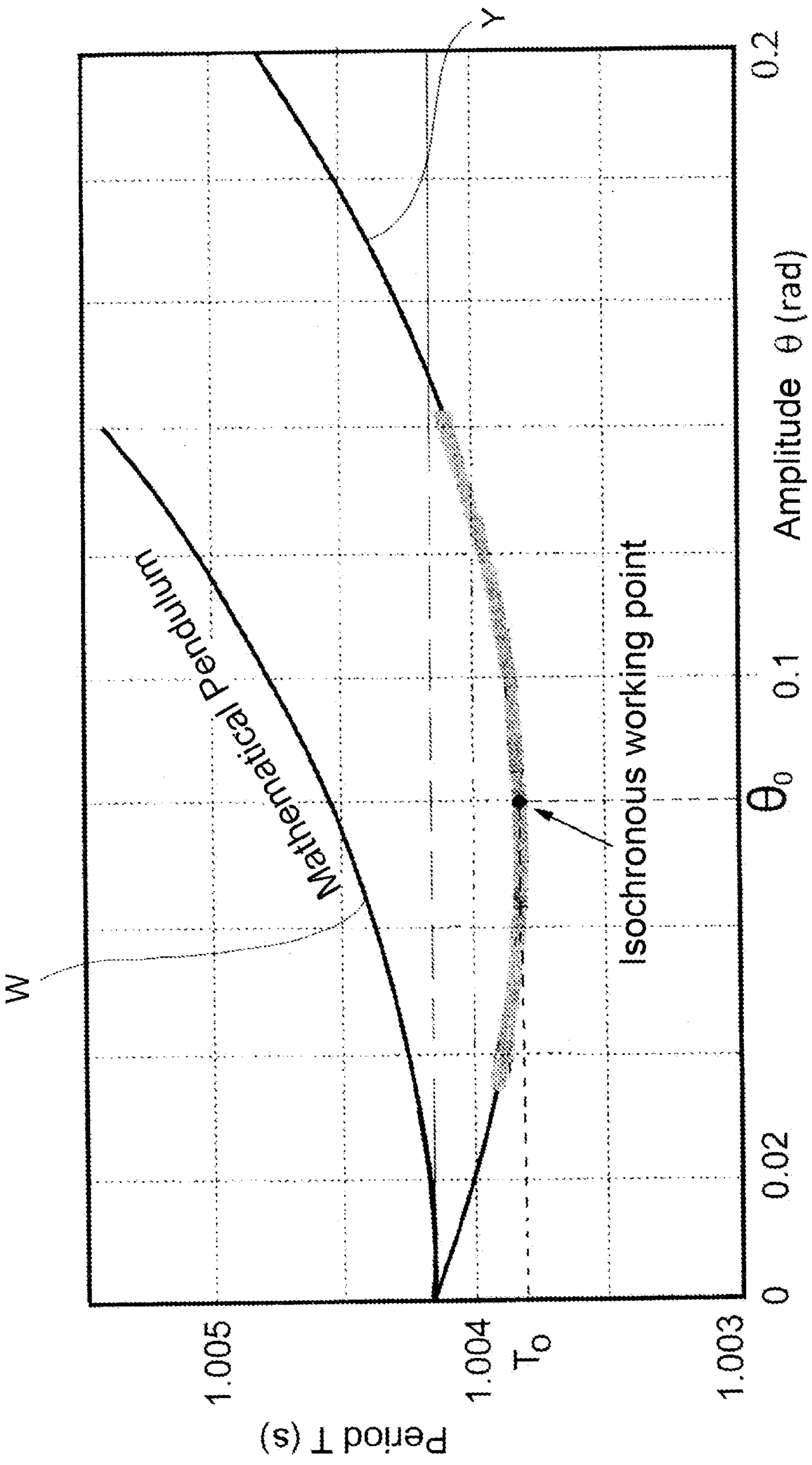
FIG. 2 is a diagram showing the variation of the period, in ordinates, as a function of the oscillation amplitude, in abscissae, in the case of a simple gravity pendulum or mathematical pendulum, and in a pendulum according to the invention.

As is shown in FIG. 2, in the case of an ideal or simple "mathematical" pendulum the amplitude of the oscillation θ varies as a function of the period of the oscillation T in accordance with a curve W that is basically an arc of a parabola, having an absolute minimum period value $T_0$ when the amplitude of the oscillation is 0.

In contrast, in a real pendulum, such as that described with reference to FIG. 1, the relationship of the period T as a function of the oscillation amplitude θ is, to an acceptable approximation, of the type represented by the curve Y in FIG. 2, which has an absolute minimum value $T_0$ of the oscillation period T at a nonzero value $\theta_0$ of the oscillation amplitude θ. Such a point $\theta_0, T_0$ represents an isochronous working point.

Reverting now to FIG. 1, with the pendulum 1 there is associated an oscillation maintaining system, as a whole denoted by 6, arranged to stabilize the angular amplitude of oscillation θ, so as to keep the period of oscillation T substantially within a small neighborhood of the minimum value $T_0$.

The oscillation maintaining and stabilizing system 6 associated with pendulum 1 in FIG. 1 includes a permanent magnet M attached at the lower surface of the oscillating body 5. Such a magnet M is, for example, cylindrical, of the neodymium-iron-boron type, and is magnetized according to a radial axis with respect to the horizontal axis *5a* of the body 5, i.e., according to the vertical longitudinal axis of the magnet M in the condition of FIG. 1.

The oscillation maintaining and stabilizing system 6 also comprises two electrically conductive elements 7 and 8, preferably coplanar, attached to a stationary support plate 9 connected in a non-illustrated manner to the support structure 2 of the pendulum 1. The elements 7 and 8 are, for example, in the form of parallelepiped plates or ingots, made of copper or other material having a good electrical conductivity, and are arranged on the plate 9 in a horizontally spaced relation.

In the condition shown in FIG. 1, the magnet M is in a position horizontally intermediate between the positions of elements 7 and 8, at a vertical distance of a few millimeters, say 4-5 millimeters, from the horizontal plane in which the upper surfaces or faces of said elements 7, 8 extend.

To a good approximation, it can be assumed that the oscillating body 5 and the portions of the flexible element 4 extending between said body and the pairs of cylinders A, B and C, D form on the whole a sort of articulated parallelogram, so that during the oscillation the body 5 and the magnet M remain substantially parallel to themselves.

Figure 3:
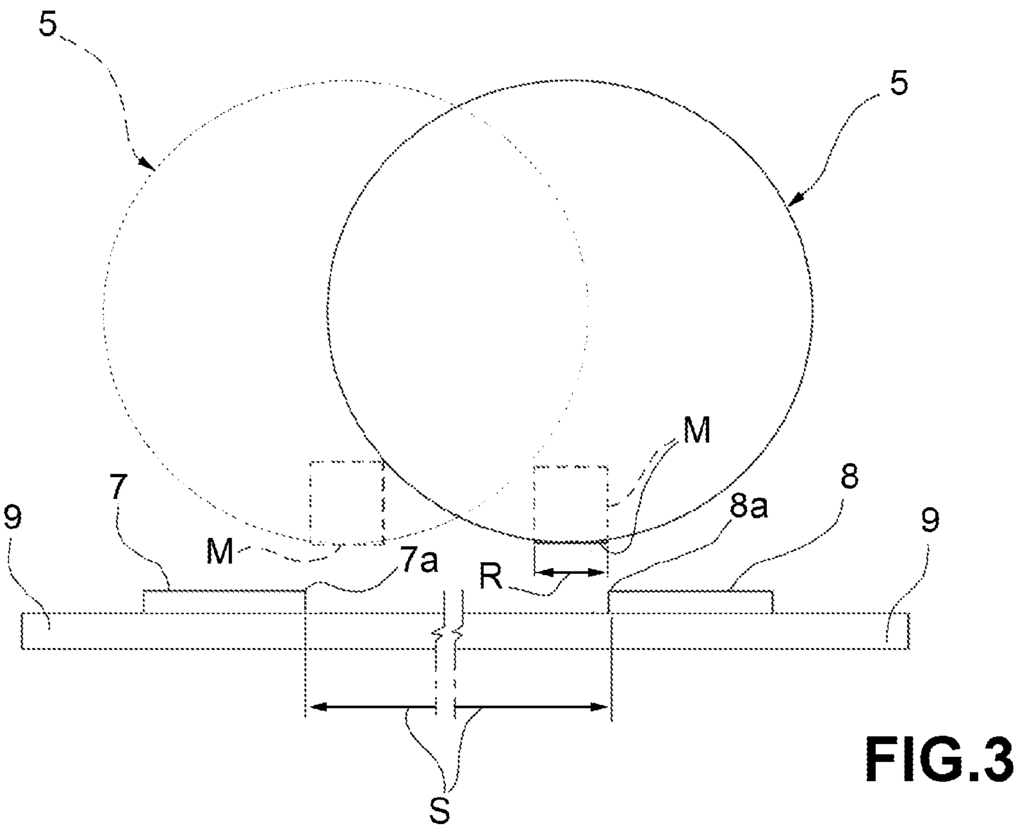
FIG. 3 is a partial representation in elevation of the pendulum according to FIG. 1 in two operating positions/conditions.
Figure 4:
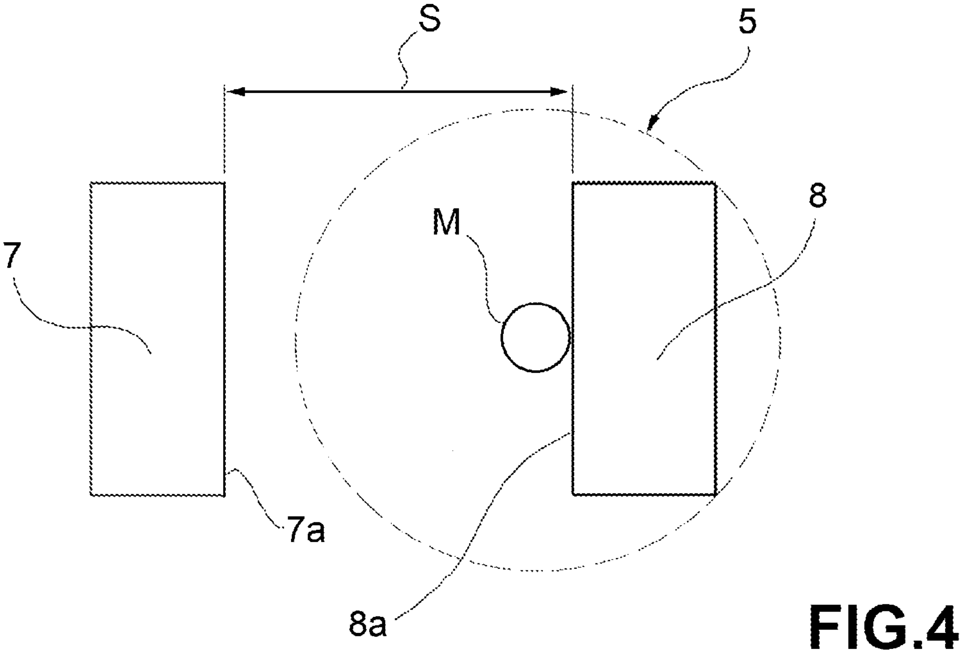
FIG. 4 is a partial representation in top view of the pendulum in the condition according to FIG. 3.

As can be seen in FIGS. 1, 3 and 4, elements 7 and 8 have respective upper edges *7a* and *8a*, facing each other, extending in (preferably) parallel directions, intersecting (preferably at 90 degrees) the plane of oscillation of body 5. When body 5 is near a position of reversal of its oscillation motion the portions of elements 7 and 8 located near said edges *7a*, *8a* are invested by a portion of the magnetic flux generated by permanent magnet M.

The mutual horizontal distance S between the edges *7a* and *8a* of elements 7 and 8 is such that in operation no significant magnetic flux generated by magnet M flows through them, except when body 5 reaches an end position (or position of reversal) of the oscillatory motion.

A magnetic flux flows either through element 7 or element 8 in the phases of approach to and departure from a position of reversal of motion and generates eddy currents in the conductive element concerned, which currents in turn generate a braking force on the magnet M and, by the Joule effect, cause in that conductive element a thermal dissipation of the energy lost by the oscillating body 5. This dissipation of energy causes a reduction in the quality factor Q of the pendulum, to an extent which depends on the amplitude of oscillation according to a relationship that is a function of the field distribution of the magnet M and the velocity of the oscillating body 5.

The analytical derivation of this relationship is rather complex, but the important fact is that, as the inventor has found, the Q factor is essentially inversely proportional to a power, at least equal to the square, of the oscillation amplitude when the reversal of the motion occurs as soon as the magnetic flux from magnet M begins to invest element 7 or element 8 at its edge 7*a* or 8*a*.

Figure 5:
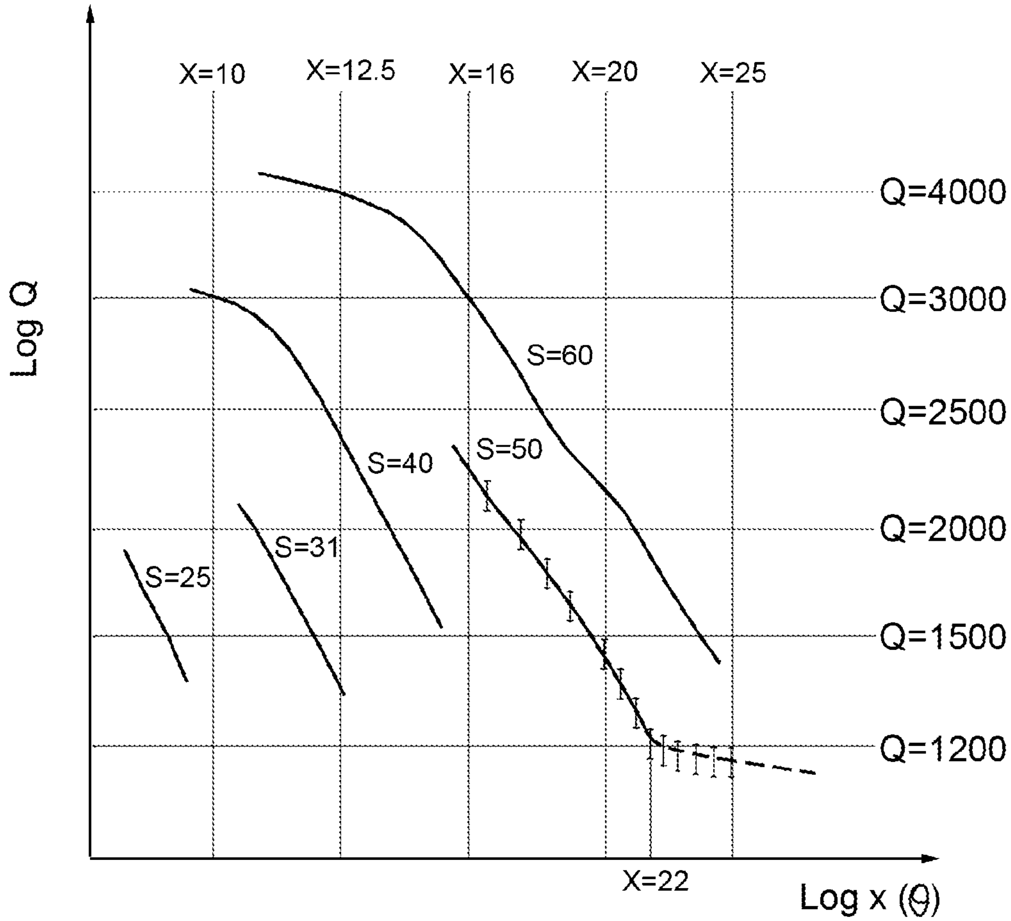
FIG. 5 is a logarithmic scale diagram illustrating the measured factor of merit Q in a real pendulum according to the invention, as a function of a parameter x univocally related to the amplitude of oscillation θ.

The graph in FIG. 5 shows the results of measurements made with a prototype pendulum according to FIG. 1 with a length L of 16 cm, with elements A-D having a diameter of 13 mm, a magnet M having a diameter of 6 mm, and with two conductive elements 7 and 8 made of silver, half an ounce each, arranged at a vertical resting distance of 4 mm from the bottom face of the magnet M.

That graph shows on the ordinate the base-10 logarithm of the measured pendulum quality or merit factor Q as a function of the base-10 logarithm of the maximum horizontal displacement or elongation x of the vertical axis of the magnet M with respect to the direction of that axis at rest (x being measured in the horizontal plane containing the upper surfaces or faces of conductive elements 7 and 8), for different values of the horizontal separation distance S (in mm) between the conductive elements 7 and 8. The horizontal displacement $x=x(\theta)$ is univocally correlated with the magnitude of the corresponding angular displacement or amplitude of oscillation $\theta$ of body 5, but is measurable more easily than $\theta$. Some direct values of Q and x have been marked in the graph in FIG. 5 for ease of reference.

The slope of the various solid-line curves in the graph in FIG. 5 confirms that the value of Q is essentially proportional to $\theta^{-2}$ in a range of amplitudes near the position of the edge 7*a*, or 8*a*, of the "brake" 7, or 8.

In the above graph the curve corresponding to S=50 mm for x greater than or equal to 22 exhibits initially a marked reduction in slope, and then a dotted-line extension where the log Q values have not been measured but are an "educated guess" of what would be measured if gradually increasing amplitudes were imposed on the oscillating body 5 until the magnet M travels beyond a conductive element 7 or 8, similarly to what happens in a Hatot pendulum according to U.S. Pat. No. 1,527,255 cited above when the end of the magnet provided therein extends through and beyond the metal element acting as a brake at an end position of the oscillating body. Said extension of the curve for S=50 mm has a very small slope, corresponding at most to a proportionality of the Q-factor to $\theta^{-1}$, and thus would not represent per se an improvement over Harrison's solution in which this relationship is produced by air resistance.

This confirms that in Hatot's pendulum, in which at each reversal of the oscillation the magnet passes through and beyond a "brake" before the motion is reversed, the prolonged interaction between the magnet field and the "brake" causes a considerably increased heat dissipation that is not much dependent on the amplitude of the oscillation. Thus, the solution according to U.S. Pat. No. 1,527,255 does not achieve much stabilization of the amplitude of the pendulum oscillation, and in any case no better than in Harrison's pendulums.

Returning to FIG. 5, it is important to note that the electromagnetic brake stabilization system described above, in addition to offering a steeper reduction in the factor of merit Q than that produced by air resistance in Harrison's clocks, also allows to select at will, by properly positioning the "brake(s)", the values of the amplitudes at which one wishes an abrupt reduction in Q to occur and thus makes it easier to achieve the desired operating point.

According to Harrison's approach, the achievement of the desired working point was, by his own admission, extremely complicated because, since air resistance is difficult to change, very careful design and implementation were required, by trial and error, in order to obtain the desired reciprocal positioning between the working oscillation amplitude and that at which the minimum of the circular error curve occurs, or a desired slope of the circular error curve with the amplitude around the working point, such that it could be used for compensating changes in air resistance.

This process involved difficult experimental convergence, with significant time expenditure, for choosing the radius of curvature of the suspension cheeks and the characteristics of the suspension tape (material and thickness), as well as the mass of the moving body or bob.

Figure 7:
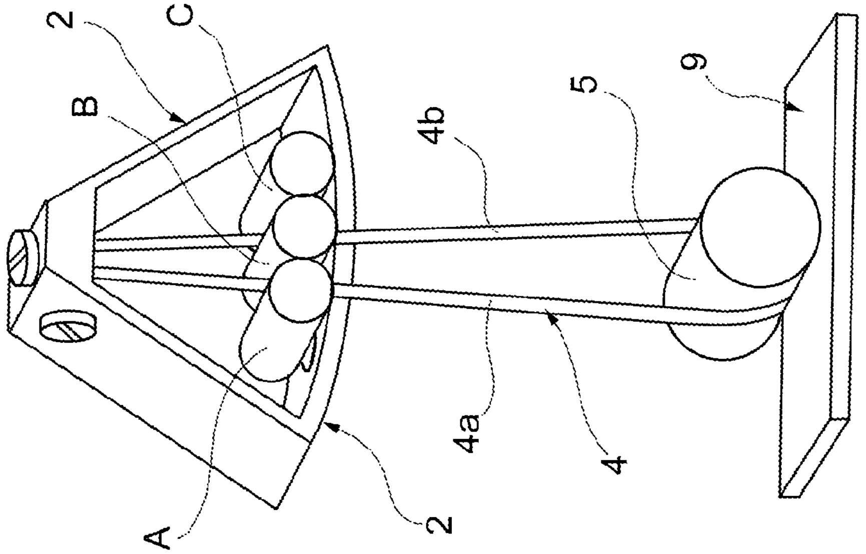
FIGS. 6 and 7 are partial representations of additional pendulums according to the invention.
Figure 6:
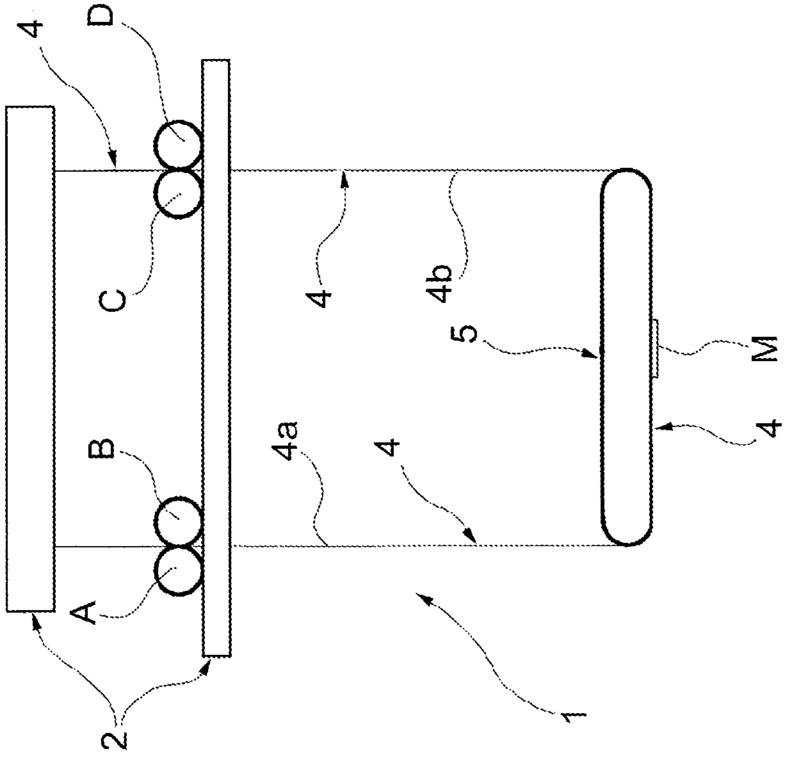

FIGS. 6 and 7 show two variants of the pendulum shown in FIG. 1. In these figures, parts and elements already described have again been given the same reference numbers used previously.

FIG. 6 shows a variant of the pendulum in which the movable body 5 is in the shape of a cylinder, however not with a circular cross section, but with a horizontally elongated cross section, in order to reduce aerodynamic dissipation.

In the variant according to FIG. 7 there are only three supporting cylinders or cheeks, indicated A, B and C, and the two branches 4*a* and 4*b* of tape 4 extend into respective gaps defined between the end cylinders A and C and the intermediate cylinder B.

Otherwise, the structure and modus operandi of the pendulum according to FIG. 7 also substantially correspond to those of the pendulum according to FIG. 1.

Figure 8A:
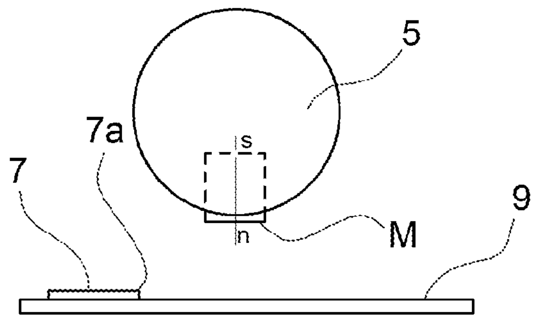
FIGS. 8*a* through 8*d* are schematic representations of further variants.
Figure 8B:
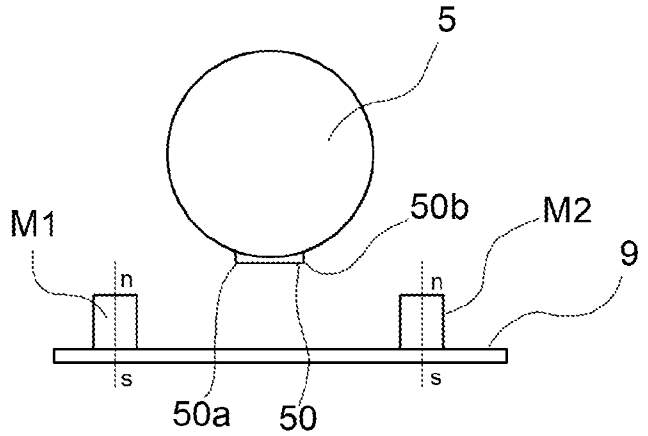

Additional implementation variants are diagrammatically illustrated in FIGS. 8*a*-8*b*.

In the variant according to FIG. 8*a* the permanent magnet M carried by the oscillating body cooperates with only one stationary conductive element, which in the example shown is element 7 (but alternatively could be element 8). In this type of variant for the purpose of oscillation amplitude stabilization the motion of the oscillating body 5 is electromagnetically braked only once per forward and return oscillation.

FIG. 8*b* shows a variant comprising two stationary permanent magnets M1 and M2 cooperating with a conductive element 50 attached to the oscillating body 5. The element 50 has two edges 50*a* and 50*b* intended to be invested by the flux generated by the magnets M1 and M2, respectively, when the oscillating body 5 is in the vicinity of one and the other motion reversal position, respectively. In this variant one or both magnets can also be used to detect the position and/or velocity of the oscillating body. In a further variant not shown in the drawings, one of the magnets M1, M2 in FIG. 8*b* can be dispensed with.

Figure 8C:
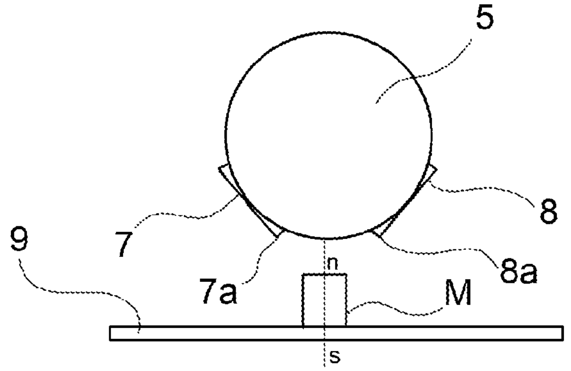

In the variant according to FIG. 8*c*, a fixed permanent magnet M is provided, cooperating with two conductive elements 7 and 8 attached to the oscillating body 5. The edge or edges 7*a* and 8*a* of these elements, which are closer to each other, are invested by the flux generated by the magnet M when the oscillating body is in the vicinity of one and the other position of motion reversal, respectively. In a further variant not shown in the drawings, one of the conductive elements 7 and 8 in FIG. 8*c* can be dispensed with.

Figure 8D:
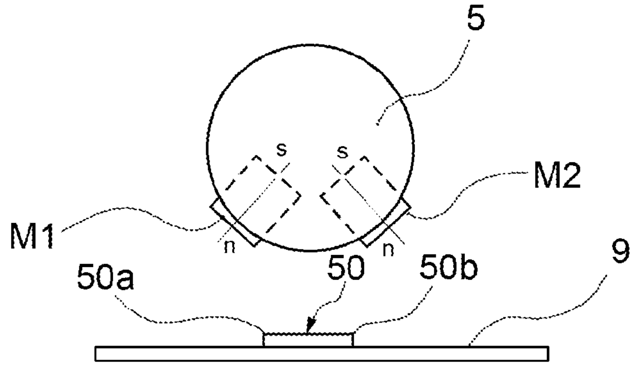

The variant according to FIG. 8*d* comprises two permanent magnets M1 and M2 attached to the oscillating body 5 at angularly spaced positions and cooperating with a stationary conductive element 50. The edges or corners 50*a* and 50*b* of such an element 50 are invested by the flux generated by magnets M1 and M2 when the oscillating body 5 is in the vicinity of one and the other motion reversal positions, respectively. In a further variant not shown in the drawings, one of the magnets M1, M2 in FIG. 8*d* can be dispensed with.

In variants with two permanent magnets (M1, M2; FIGS. 8*b* and 8*d*), it is convenient that these magnets present to the associated conductive element 50 polar ends of the same type, e.g. "north" type as indicated by n in the aforementioned FIGS. 8*b* and 8*d* (where s indicates polarities of the opposite type, i.e. "south").

Also for the variants according to FIGS. 8*a* to 8*d* the arrangement and positioning of the magnet(s) and the conductive element(s), on the movable body 5 and relative to the supporting structure 2, are such that in the operation the quality factor Q of the pendulum is substantially proportional to the inverse of a power, equal to (or greater than) the square, of the amplitude of oscillation θ of the movable body 5 when said amplitude θ is close to the desired amplitude of oscillation $\theta_0$.

A further important aspect when making a cylindrical-cheek pendulum concerns the sizing of the diameter of the cheeks and the width of the gaps defined between them, depending on the length of the pendulum and the weight of the oscillating body 5.

In this regard, it was found that an additional effect may have a major impact on the curve that correlates the circular error ΔT/T or period T with the amplitude θ of the oscillation: the "spring" effect generated by the tape 4 to which the oscillating body 5 is suspended, when said tape winds/unwinds on/from the cheeks A-D.

This "spring" effect interacts with the force of gravity and becomes, in a relative sense, increasingly important as the amplitude of oscillation decreases.

For small oscillation amplitudes such an effect can even change the curve that correlates period T with amplitude θ in such a way that the absolute minimum value $T_0$ of the period disappears in the graph of FIG. 2 (which does not take into account the spring effect considered here). This phenomenon is illustrated in the graph in FIG. 9, in which solid line curves are plotted showing the circular error ΔT/T (in ordinates) as a function of the previously defined parameter x (in abscissae), which is uniquely related to the values of the oscillation amplitude θ, for different values of the free width FGW (in μm) of the gaps between the A-D cheeks (by free width of the gaps is meant the difference between the separation distance between the cheeks and the thickness of the tape 4). Also shown in the graph in FIG. 9 is a dashed line curve RF representing the effect of the additional pullback force due to the "spring" effect described above.

Figure 9:
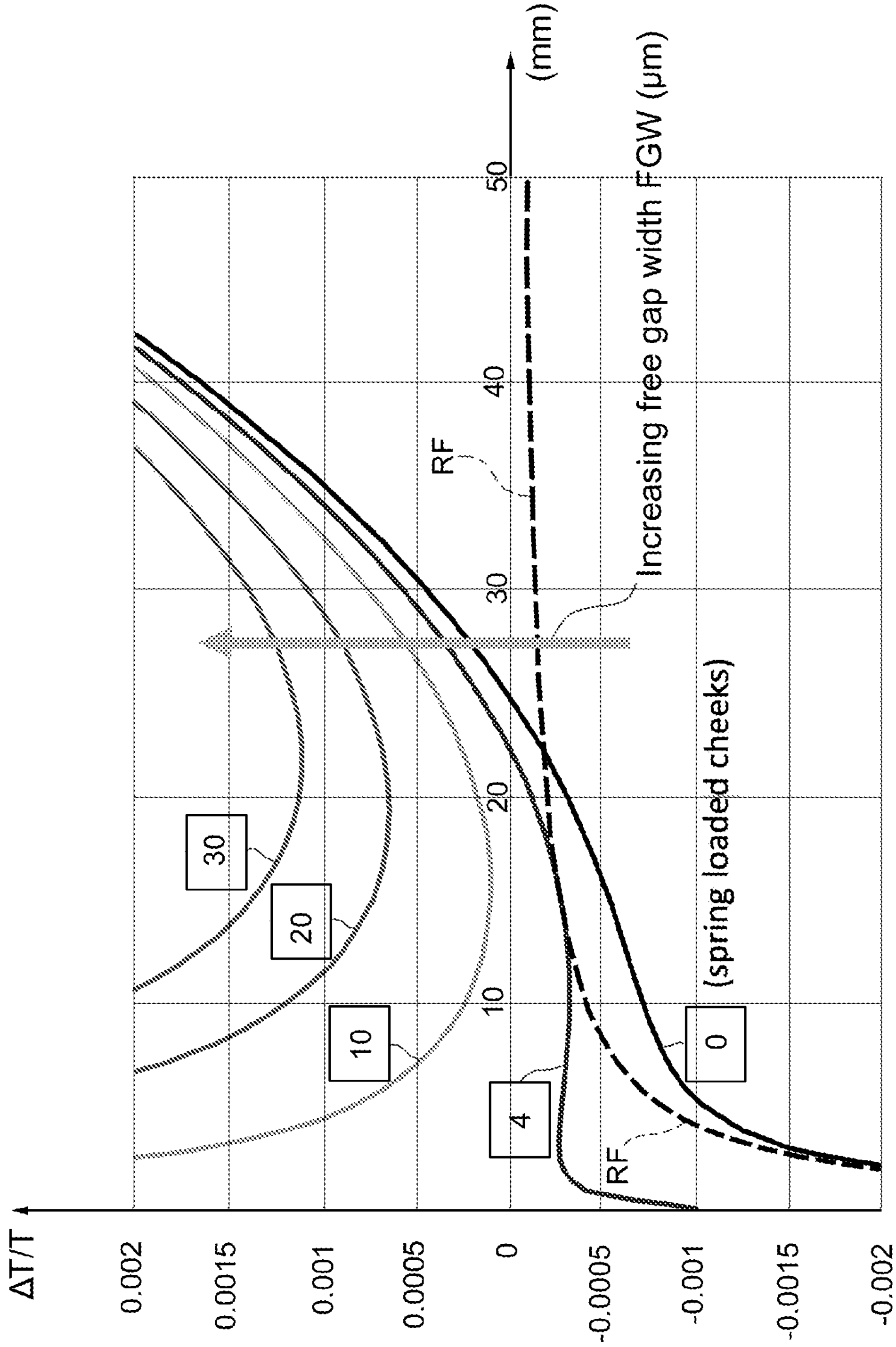
FIG. 9 is a diagram showing the relative circular error, ΔT/T, as a function of parameter x, in a pendulum in which a flexible suspension element extends into the gap between shaped supporting cheeks, for different values of the free width of the gap FGW.

The curves in FIG. 9 are for a pendulum with a length L equal to 16 cm, with cheeks A-D having a diameter of 13 mm, and FGW values ranging from 0 to 30 μm. The curve for FGW=0 corresponds to an embodiment in which the cheeks are resiliently loaded toward each other. The graph shows that for decreasing FGW values smaller than 10 μm, the curves that correlate the circular error ΔT/T with x, and ultimately with the amplitude θ of the oscillation, firstly present a relative (but still useful) minimum value, rather than an absolute minimum, and then for even smaller FGW values no longer present a useful minimum value. Furthermore, for curves that exhibit a minimum (absolute or relative) value of ΔT/T, the value and the abscissa of the latter vary as a function of the free amplitude FGW of the gaps between the cheeks. This is determined by the fact that if FGW is greater than zero, when the amplitude of oscillation is so small that the tape 4 never comes to rest on the cheeks the length of the pendulum is greater than L, implying that the period T is significantly greater than that for the working amplitude. As the amplitude is then increased from that situation, the period T passes through a junction zone in which the contribution to the period T by the transition time of the tape 4 across the free gap is gradually reduced and consequently the period T gradually approaches the values expected in the case of a zero free gap, with the result that a minimum period is produced whose position is determined by both the width FGW of the free gap and the radius of the cheeks.

Figure 10:
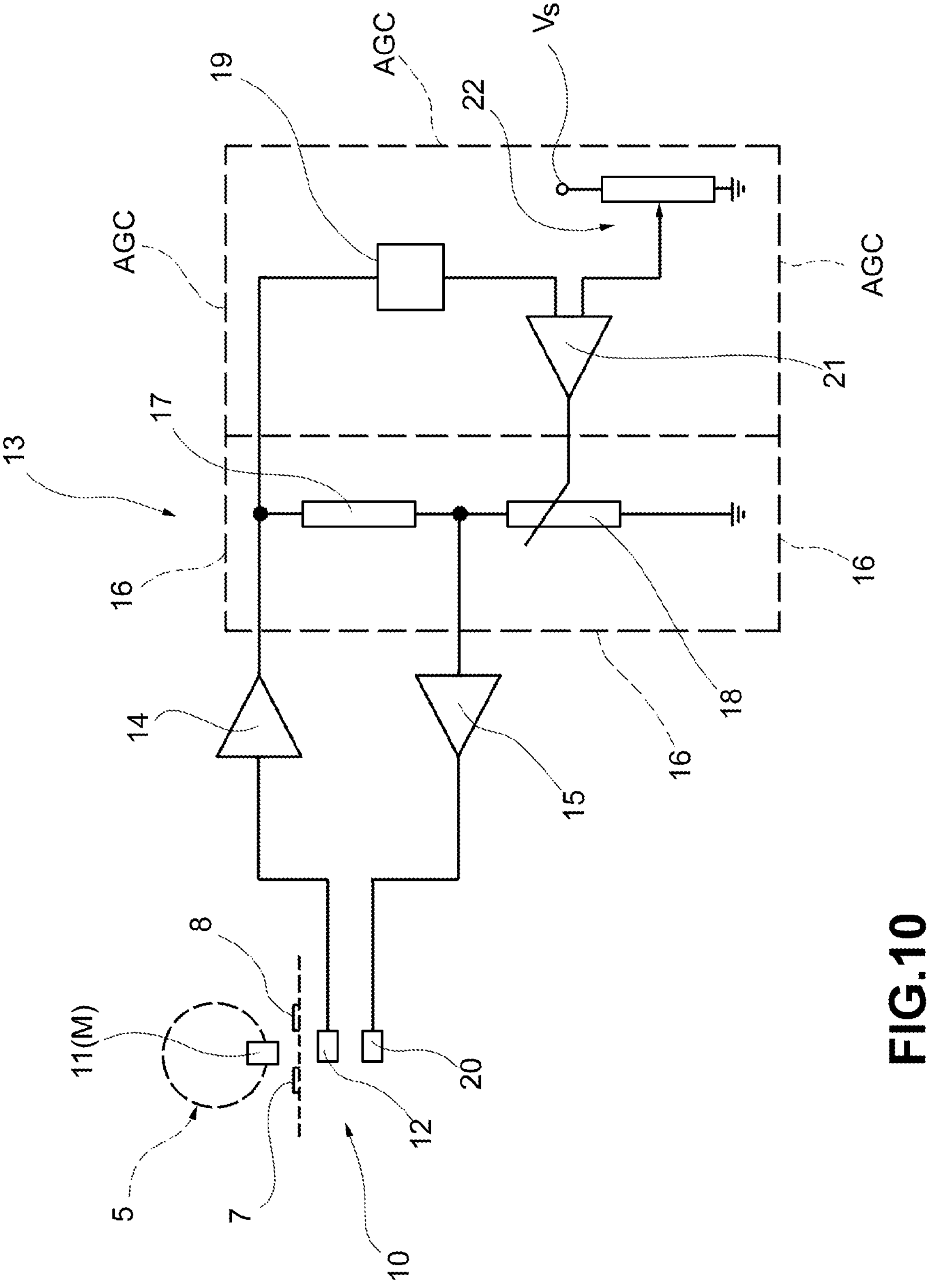
FIG. 10 is a schematic representation of an electronic oscillation control and maintaining system that can be used with a pendulum according to the invention.

As is shown in FIG. 10, the pendulum includes a system for controlling and maintaining the oscillation of the movable body 5, including a sensor 10 designed to provide electrical signals indicative of the passage of the movable body 5 by a predetermined angular position (or of the speed of oscillation of body 5).

In the exemplary embodiment shown, the sensor 10 comprises a permanent magnet 11 attached to the moving body 5, which conveniently may be the same magnet M described above, and an associated detector 12, e.g. a winding or solenoid, attached to the stationary support structure 2 of the pendulum. However, other sensor means, such as optical sensors, can be used.

Detector 12 is connected to an electronic circuit as a whole indicated 13 in FIG. 10.

In the illustrated embodiment such an electronic circuit 13 includes an amplifier 14 having an input connected to the output of the detector 12, and an output connected to a variable attenuator 16. The latter comprises, for instance, a variable-ratio resistive voltage divider, including two resistors 17 and 18, the second of which has a variable resistance.

An additional amplifier 15 has its input connected to the interconnected terminals of resistors 17 and 18 and its output connected to the drive input of a thrust actuator 20 associated with the movable body 5. Such an actuator 20 is of a per se known type, for example of the solenoid type, such as a so-called "voice coil", and is able to generate a magnetic field which, by interacting with a permanent magnet attached to the oscillating body 5, conveniently the same magnet M described above, is capable of applying to body 5 a force adequate to maintain the oscillation, compensating the effects of friction and other forces that would tend to dampen the oscillations of said body 5, and thus maintain the amplitude of the oscillation substantially at the value for which the period T of the oscillation remains at the minimum value corresponding to the isochronous working point. This is accomplished efficiently by applying to the body 5 a sine-wave force in phase with the velocity of said body 5.

The output of amplifier 14 is also connected to an automatic gain controller AGC, which includes an amplitude detector 19 connected to a first input of a differential amplifier 21, a second input of which is connected to a DC voltage source VS via a resistive voltage divider 22. The output of amplifier 21 is connected to the variable resistor 18 of resistive attenuator 16 in such a way that the attenuation introduced by that attenuator is controlled by said amplifier 21.

The intensity of the force applied to the oscillating body 5 is regulated in a closed-loop by the automatic gain controller AGC.

The electronic circuit 13 is devised so that its gain G exhibits an essentially zero phase rotation, so that the known null-phase oscillation condition for the ring gain GB (where β is the resonator transfer function) is verified at the natural frequency of the pendulum, at which the phase rotation of β is null. As is well known, however, the oscillation condition for the modulus of the ring gain is $|G\beta|=1$ in steady state, and since β is proportional to the factor Q, it follows that G must be inversely proportional to Q. So, if the value of Q varies as $\theta^{-2}$, the gain G must be proportional to the square of the desired oscillation amplitude. This fact makes it possible on the one hand to measure Q without disturbing the oscillations, by means of a gain measurement, and on the other hand to control the oscillation amplitude by varying the gain G.

The Q-factor measurements shown in FIG. 5 were obtained in that way.

The electromagnetic "brakes" 7 and 8, which in a certain range of oscillation amplitudes reduce the value of Q in a measure inversely proportional to the square of the amplitude of the oscillation, thus achieve a passive stabilization of the amplitude of the oscillation, which to a certain extent is possible even without an automatic gain controller because in principle it depends only on the gain G.

The actuator device 20 can be of any other known type and in particular, if the Q factor is very high, also of an optical type based on the use of radiation pressure.

Figure 11:
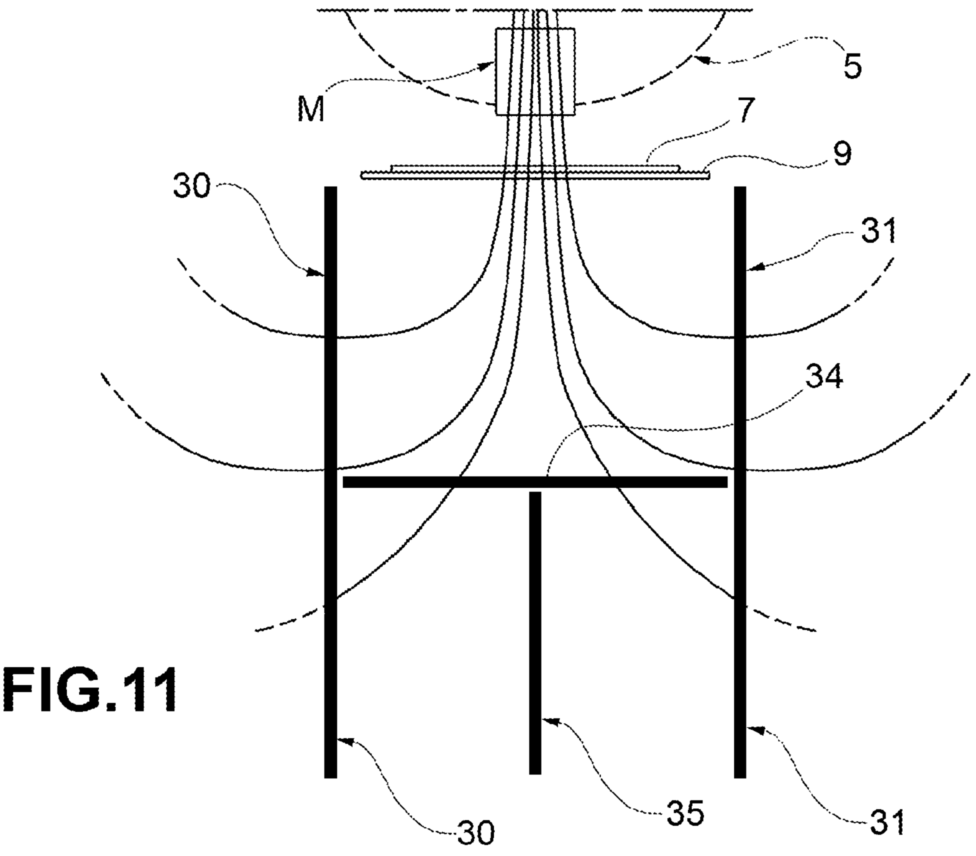
FIG. 11 is a diagrammatic representation in elevation view of part of a pendulum according to the invention.
Figure 12:
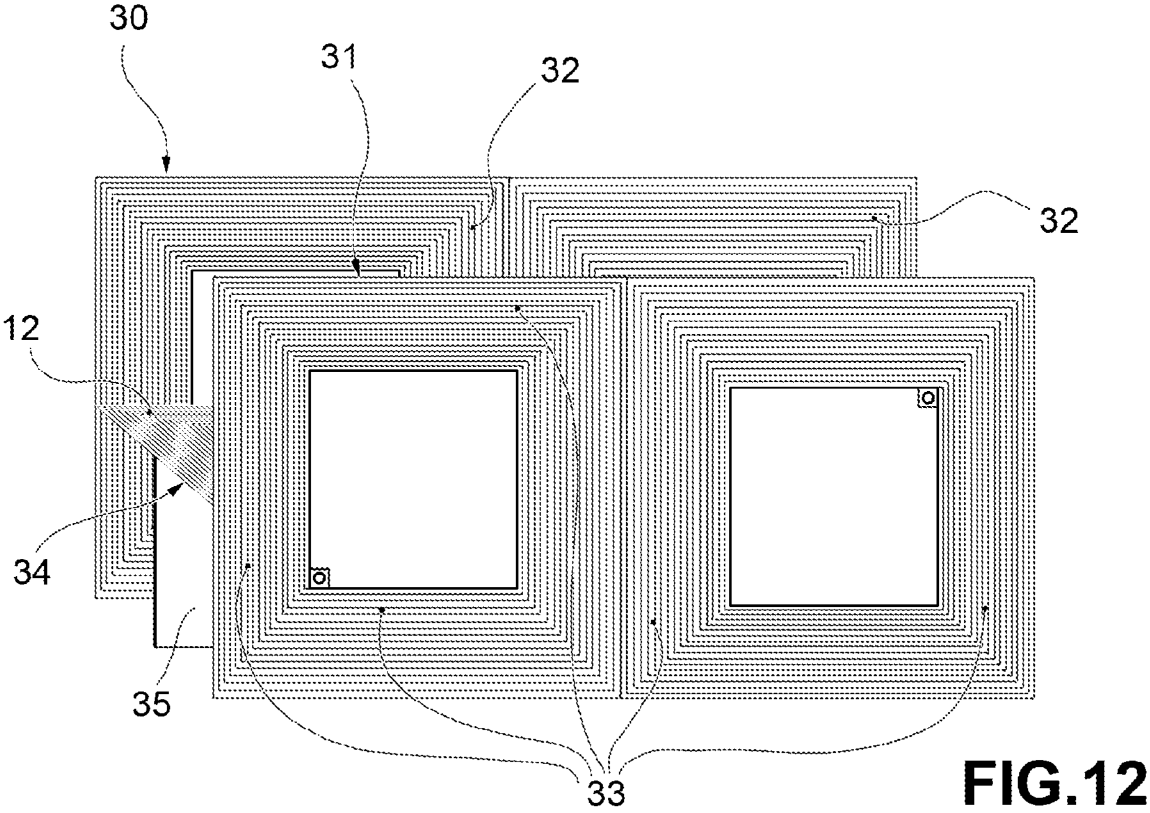
FIG. 12 is a perspective view of part of the pendulum according to FIG. 11.

FIGS. 11 and 12 schematically show an embodiment of the position or speed sensor 10-12 and the actuator device 20.

In that embodiment the detector 12 comprises two electrically insulating, parallel, vertical, facing plates 30 and 31 on which, for example by a printed circuit technique, respective planar windings 32 and 33, essentially in the shape of an 8, are provided and connected to each other.

The plates 30 and 31 are connected to a stationary support structure not shown, and are located below plate 9 which bears conducting elements 7 and 8 (FIG. 11), so that when body 5 oscillates a part of the magnetic flux generated by the magnet M carried by said body 5 periodically passes through said windings 32 and 33.

An additional insulating plate 34 is arranged horizontally below plate 9, between plates 30 and 31, and bears the winding 12 described earlier with reference to FIG. 10, which is also conveniently planar and provided by a printed circuit technique. The relative position of plate 34 with respect to plates 32 and 33 is such that the mutual inductance between the windings of sensor 12 and actuator 20 is cancelled.

The arrangement is such that a substantial part of the flux lines from the lower pole of the magnet M close back into the other pole of that magnet without passing again through the above-mentioned windings 12, 32 and 33 after the first time.

Below plate 34 and between plates 30 and 31 there is arranged an additional vertical insulating plate 35 bearing the circuit components 13, 16 and AGC of FIG. 10.

Figure 13:
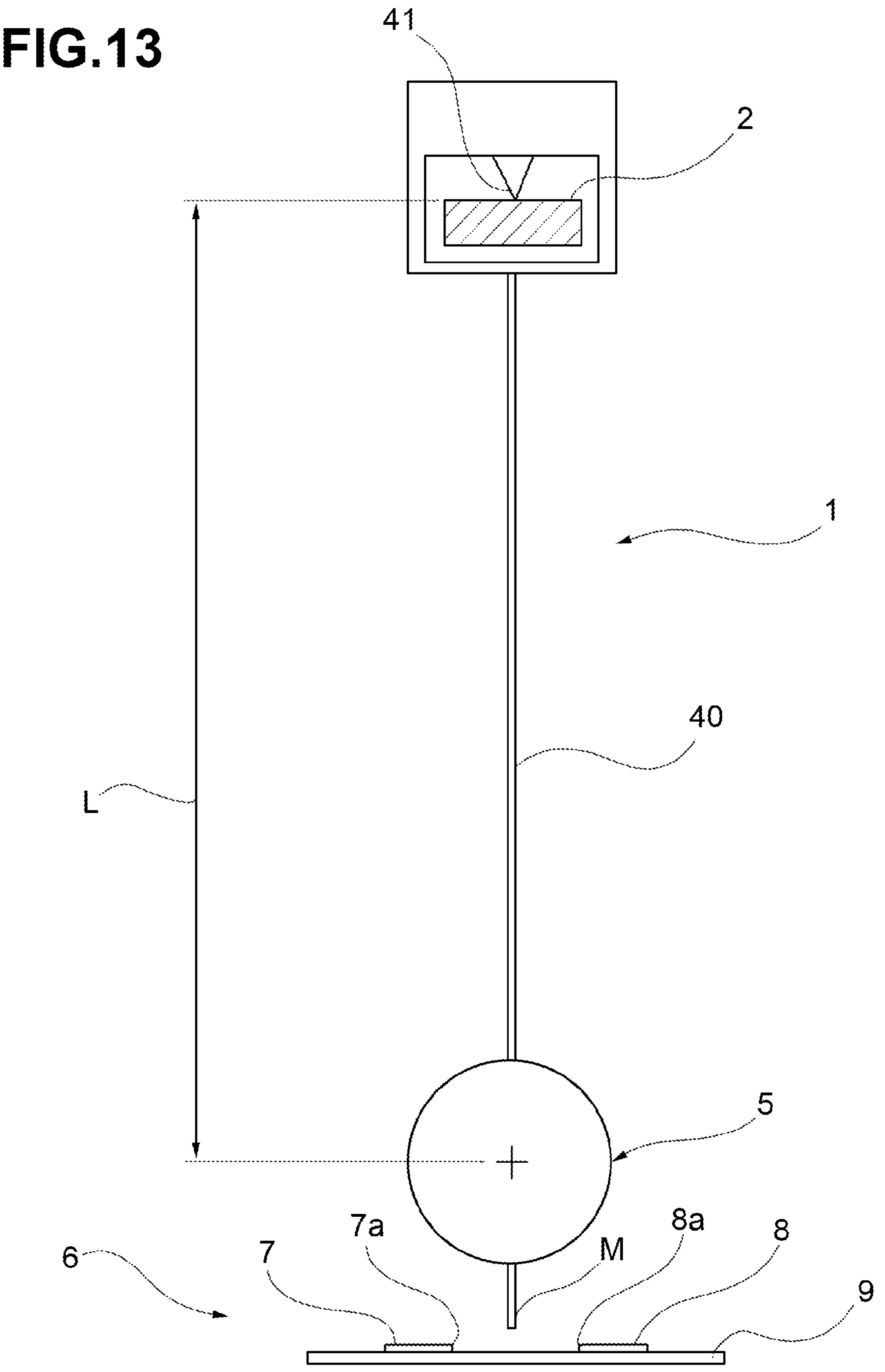
FIG. 13 is a diagrammatic representation of a pendulum according to the prior art transformed into a pendulum according to the invention by retrofitting some devices.

FIG. 13 illustrates a further embodiment of the present invention implemented by a retrofitting of a conventional pendulum 1. In the illustrated example, the pendulum 1 comprises an operationally oscillating body 5 carried by a substantially rigid rod 40 and suspended from a supporting structure 2 by means of a so-called knife blade 41. Such a pendulum may be of a purely mechanical type, or of an electromechanical type.

For the stabilization of the oscillation amplitude, according to the invention the pendulum is equipped with a permanent magnet M attached to the oscillating body 5 and with two conductive elements 7 and 8 made and arranged as more fully described hereinbefore (or equipped with the conductive elements and magnets of the alternative embodiments described above with reference to FIGS. 8*a*-8*d*).

With the retrofitting described above, it is possible to appreciably improve the performance of an ordinary conventional pendulum.

It is understood that embodiments presented herein are meant to be exemplary. Although the present disclosure has been described in detail with reference to certain preferred configurations thereof both in the specification and in the claims, other versions are possible. Embodiments of the present disclosure can comprise any combination of compatible devices/features described herein and/or shown in the figures, and these embodiments should not be limited to those expressly illustrated and discussed. For instance and not by way of limitation, the appended claims could be modified to be multiple dependent claims so as to combine any combinable combination of elements within a claim set, or from differing claim sets. Claims depending on one independent claim could be modified so as to depend from a different independent claim. Therefore, the spirit and scope of the disclosure should not be limited to the versions described above.

While the foregoing written description of the disclosure enables one of ordinary skill to make and use what is considered presently to be the best mode thereof, those of ordinary skill will understand and appreciate the existence of variations, combinations, and equivalents of the specific embodiments, methods, systems, and examples herein. The disclosure should therefore not be limited by the above described embodiments, methods, systems, and examples. Furthermore, certain terminology has been used for the purposes of descriptive clarity, and not to limit the present disclosure. It is therefore intended that the following appended claims include all such alterations, modifications and permutations as fall within the true spirit and scope of the present disclosure. No portion of the disclosure is intended, expressly or implicitly, to be dedicated to the public domain if not set forth in the claims.

The invention claimed is:

1. A pendulum, comprising:
- a movable body connected to a stationary supporting structure for oscillation in a vertical plane fixed relative to said supporting structure, in an angular field of oscillation extending around an intermediate angular position of rest, and
- a control and stabilization system for controlling and stabilizing an amplitude of oscillation of the movable body, including
  - a braking device for damping oscillatory motion of the movable body, comprising a permanent magnet attached to the movable body and at least one stationary electrically conductive element arranged in a fixed position relative to said supporting structure in proximity of a position of reversal of motion of the movable body and having a horizontal edge which intersects a plane of oscillation of the movable body, so that when the movable body approaches said position of reversal of motion a magnetic flux generated by the magnet starts to induce in the conductive element eddy currents determining a braking of the motion of the movable body; and
  - a maintaining system for maintaining the oscillation of the movable body, including
    - an actuator device designed to impart successive accelerations to the movable body,
    - a sensor device designed to provide an indication of the position and/or velocity of the movable body in the field of oscillation, and
    - driving means arranged to acquire indications from the sensor device and drive the actuator device in a predetermined manner;
    - wherein the position of the magnet on the movable body and the position of the at least one conductive element relative to the supporting structure are such that in operation a quality factor of the pendulum is substantially proportional to an inverse of a power, equal to or greater than the square, of the amplitude of oscillation of the movable body when said amplitude is close to a desired amplitude of oscillation.

2. The pendulum of claim 1, wherein the control and stabilization system is arranged so that the motion of the movable body is reversed when an orthogonal projection of the magnet on the horizontal plane containing said edge of the at least one conductive element is substantially tangent to said edge.

3. The pendulum of claim 2, wherein the braking device further comprises a second conductive element disposed stationary in proximity of the other angular position of reversal of the motion of the movable body and presenting a horizontal edge intersecting the plane of oscillation of the movable body;

the control and stabilization system being arranged so that the motion of the movable body reverses at each of said conductive elements when the orthogonal projection of the magnet on the horizontal plane containing said edges is substantially tangent to one of said edges.

4. The pendulum of claim 3, wherein said conductive elements are coplanar and said edges thereof are essentially parallel to each other.

5. The pendulum of claim 1, wherein the sensor device comprises the permanent magnet of said braking device, and a magnetic field detector disposed stationary in the supporting structure of the pendulum and capable of detecting, at each oscillation of the movable body, the magnetic field generated by said permanent magnet.

6. The pendulum of claim 5, wherein the detector device and/or the actuator device comprise at least one planar winding.

7. The pendulum of claim 1, wherein the movable body is connected to the supporting structure by means of a suspension arrangement comprising a flexible element which is connected to the movable body and which extends between at least two opposing elements or supporting cheeks having respective symmetrical convex bearing surfaces facing each other, so that when the movable body oscillates said flexible element alternately winds on a first of said respective bearing surfaces and then a second of said respective bearing surfaces, and alternately unwinds from said second of said respective bearing surfaces and then said first of said respective bearing surfaces; and wherein said bearing surfaces have respective profiles and mutual distances such that in operation the period of oscillation of the moving body varies, as the amplitude of oscillation varies, according to a curve presenting an absolute or relative minimum value of the period of the oscillation at a non-zero value of the oscillation amplitude.

8. The pendulum of claim 7, wherein said means of suspension are arranged so that when the movable body oscillates said permanent magnet moves therewith remaining parallel to itself.

9. A pendulum, comprising:

a movable body connected to a stationary supporting structure for oscillation in a vertical plane fixed relative to said supporting structure, in an angular field of oscillation extending around an intermediate rest position, and a control and stabilization system for controlling and stabilizing an oscillation amplitude of the movable body, comprising:

a braking device for damping oscillatory motion of the movable body, comprising a permanent magnet and an electrically conductive element, one of which is attached to the movable body and the other is connected to the supporting structure, such that when the movable body approaches one end of the oscillation field a magnetic flux generated by the magnet induces in the conductive element eddy currents causing a braking of the motion of the movable body;

wherein the magnet and the conductive element, as well as the position of one of them on the movable body and the position of the other one of them relative to the supporting structure, are such that in the operation a quality factor of the pendulum is substantially proportional to an inverse of a power, at least equal to the square, of the amplitude of the oscillation of the movable body when said amplitude is close to a desired amplitude of oscillation.

* * * * *